(12) United States Patent
Horn et al.

(10) Patent No.: US 12,157,825 B2
(45) Date of Patent: Dec. 3, 2024

(54) NATURAL COLORANTS AND PROCESSES OF MAKING SAME

(71) Applicant: Wild Flavors, Inc., Erlanger, KY (US)

(72) Inventors: Gregory Horn, Erlanger, KY (US); Lori Murphy, Erlanger, KY (US); Shaowen Wu, Cincinatti, OH (US); Laura Stidham, Cincinatti, OH (US); Ahmad K. Hilaly, Bryan, TX (US)

(73) Assignee: Wild Flavors, Inc., Erlanger, KY (US)

( * ) Notice: Subject to any disclaimer, the term of this patent is extended or adjusted under 35 U.S.C. 154(b) by 514 days.

(21) Appl. No.: 15/766,038

(22) PCT Filed: Oct. 5, 2016

(86) PCT No.: PCT/US2016/055547
§ 371 (c)(1),
(2) Date: Apr. 5, 2018

(87) PCT Pub. No.: WO2017/062489
PCT Pub. Date: Apr. 13, 2017

(65) Prior Publication Data
US 2021/0292567 A1    Sep. 23, 2021

Related U.S. Application Data

(60) Provisional application No. 62/237,297, filed on Oct. 5, 2015.

(51) Int. Cl.
*A61K 36/00* (2006.01)
*C09B 61/00* (2006.01)
*C09B 67/54* (2006.01)

(52) U.S. Cl.
CPC .......... *C09B 61/00* (2013.01); *C09B 67/0096* (2013.01)

(58) Field of Classification Search
None
See application file for complete search history.

(56) References Cited

U.S. PATENT DOCUMENTS

| 6,331,569 | B1 * | 12/2001 | Kisters | A61K 8/447 514/561 |
| 8,945,640 | B2 * | 2/2015 | Wu | A23L 5/43 424/777 |
| 2009/0246343 | A1 * | 10/2009 | Wu | A23L 5/48 426/540 |
| 2012/0114772 | A1 * | 5/2012 | Roesler | A23L 33/105 424/769 |

OTHER PUBLICATIONS

Revilla et al. (1998) J. Agric. Food Chem. 46: 4519-4597. (Year: 1998).*

* cited by examiner

*Primary Examiner* — Russell G Fiebig
(74) *Attorney, Agent, or Firm* — Andrew F. Nilles (57) ABSTRACT

The present invention is directed towards natural colorants comprising a material selected from the group consisting of genipin, purified genipin, pre-genipin compounds, iridoid compounds, genipin deriviatives, a genipin-containing substance, and combinations of any thereof; and a primary amine containing compound. Processes of making natural colorants are further disclosed. Additionally, processes of producing a desired color of natural colorants are disclosed.

10 Claims, 7 Drawing Sheets

SAMPLES OF NATURAL BLUE COLORANT IN SOLUTION

COMPARISON OF SAMPLES OF NATURAL COLORANTS
MADE WITHOUT AND WITH RECYCLED PERMEATE

Fig.5

BLUE COLORANTS OBTAINED BY METHODS OF THE PRESENT INVENTION, RANKED FROM MOST VIBRANT BLUE COLOR ON THE RIGHT, IN ORDER FROM LEFT TO RIGHT: COLORANTS CONTAINING ISOLEUCINE, METHIONE, ALANINE, GLUTAMINE, PHENYLALANINE, ASPARGINE, SERINE, AND PROLINE

Fig. 6

COMPARISON OF CONTROL AND PURIFIED COLORANTS

Fig. 7

NATURAL COLORANTS AND PROCESSES OF MAKING SAME

CROSS-REFERENCE TO RELATED APPLICATIONS

This application is a national stage entry of International Application No. PCT/US2016/055547, filed Oct. 5, 2016, which itself claims priority to U.S. Provisional Patent Application No. 62/237,297, filed Oct. 5, 2015, each of the contents of the entirety of which are incorporated by this reference.

TECHNICAL FIELD

The present invention relates generally to natural colorants. The present disclosure is further directed to processes of making natural colorants. The present disclosure additionally is directed to processes of optimizing natural colorants.

BACKGROUND OF THE INVENTION

Currently a decreasing number of people are willing to consume food products or use cosmetic products colored synthetically, which has resulted in steady growth of the natural colorant market. As stated in U.S. Pat. No. 8,557,319 to Wu et al., the content of which is incorporated herein by reference in its entirety, some of the first natural blue colors commercially feasible are those derived from gardenia fruits (*Gardenia jasminoides*).

However, gardenia blue is not currently available in US and European markets and only available in some Asian markets as a safe color product for food and drug applications.

Gardenia fruit contains a large amount of iridoids such as geniposide, gardenoside, genipin-1-b-gentiobioside, geniposidic acid, and genipin. (Endo, T. and Taguchi, H. Chem. Pharm. Bull. 1973). Genipin is a key compound contributing to gardenia blue when it is reacted with specific chemicals. (U.S. Pat. No. 4,878,921). Gardenia blue may be made by reacting geniposide extracted from Gardenia juice, purified genipin, or genipin derivatives, with certain isolated chemicals.

Genipin and other iridoid compounds, such as genipic acid, genipin gentiobioside, geniposide, and geniposidic acid are found in the fruits of *Genipa americana*, also known as genipap or huito, a wild plant of Latin America. The mature fruits of *Genipa americana* have been used in cooling drinks, jellies, sherbet, ice cream, sweet preserves, syrup, the soft drink genipapada, wine, a potent liqueur, and a tanning extract. Green or unripe fruits have been used as a color source to paint faces and bodies for adornment, to repel insects, and to dye clothing, pottery, hammocks, utensils, and basket materials a bluish-purple. The fruit and juices also have medicinal properties, for example, syrups used as cold and cough medicine. The flowers and bark of *Genipa americana* also have medicinal properties.

*Genipa americana* is also a natural source of iron, riboflavin, and anti-bacterial substances, apart from the carbohydrates, sugar, proteins, ash, and malic acid found in its fruits. The principal biochemical compounds of *Genipa americana* include: calcium, phosphorous, vitamin C, caffeine, caterine, genipic acid, genipin, gentiobioside, genipinic acid, geniposide, geniposidic acid, gardenoside, genamesides A-D, gardendiol, deacetyl asperulosidic acid methyl ester, shanzhiside, glycerides, hydantoin, mannitol, methyl esters, tannic and tartaric acid, and tannins.

Methods of preparing a genipin-rich red colorant from *Genipa americana* are known in the art. (U.S. Pat. No. 8,945,640). Methods of preparing stable, natural colors from the juice of a fruit or plant from the Rubiaceae family containing genipin or derivatives of genipin, and other juice from a suitable food-grade source, are also known in the art. (U.S. Pat. No. 8,557,319). US Pat. App. No. 2014/0350127 discloses methods of preparing a colorant composition comprising mixing *Genipa americana* juice and a specific chemical, removing sugar from the mixture, and isolating the colorant composition. U.S. Pat. No. 7,927,637 discloses a method of manufacturing a colorant pH-stable blue comprising peeling *Genipa americana* fruit from its skin, obtaining raw liquid juice from the *Genipa americana* fruit pulp, mixing the raw liquid juice with glycine, and warming the raw liquid juice mixed with glycine.

Additionally, while spirulina extract has been approved by the FDA as a source of blue color in candy and gum, US manufacturers have limited options when it comes to broad applications of natural blue and green colors. (Watson, E., FoodNavigator-USA, Aug. 14, 2013, http://www.foodnavigator-usa.com/Regulation/The-wait-is-over-for-a-natural-blue!-FDA-approves-spirulina-as-food-color-in-US-as-Mars-petition-gets-green-light). Spirulina has limited use for food products since it tends to settle out in acidic beverages and is not overly heat stable. (Watson, E., Food-Navigator-USA, Aug. 26, 2013, http://www.foodnavigator-usa.com/Suppliers2/WILD-Flavors-Our-fruit-juice-based-natural-blue-color-was-around-in-the-US-long-before-spirulina-got-the-green-light).

There remains a need for natural colorants which are pH-stable over a wide range of pH's as well as heat and light stable, so as to be used in a variety of foods and beverages.

SUMMARY OF THE INVENTION

In one embodiment, a natural colorant comprising a material selected from the group consisting of genipin, purified genipin, pre-genipin compounds, iridoid compounds, genipin derivatives, a genipin-containing substance and combinations of any thereof, reacted with a primary amine containing compound is disclosed.

In another embodiment, a process of making a natural colorant comprising mixing an primary amine containing compound with a material selected from the group consisting of genipin, purified genipin, pre-genipin compounds, iridoid compounds, genipin derivatives, a genipin-containing substance and combinations of any thereof, thus forming a blend, and heating the blend, thus producing the natural colorant is disclosed. In a further embodiment, processes of the present invention further comprise filtering the blend, resulting in a permeate. In yet further embodiments, processes of the present invention comprising mixing a primary amine containing compound with a material selected from the group consisting of genipin, purified genipin, pre-genipin compounds, iridoid compounds, genipin derivatives, a genipin-containing substance, and combinations of any thereof, thus forming a blend, and heating the blend, thus producing the natural colorant further comprise mixing the permeate with the primary amine containing compound; the material selected from the genipin, purified genipin, pre-genipin compounds, iridoid compounds, genipin derivatives, a genipin-containing substance, and combinations of any thereof; the blend; or combinations of any thereof.

In an additional embodiment, a process of producing a desired color of a natural colorant comprising mixing a first amino acid and a second amino acid with a material selected from the group consisting of genipin, purified genipin, pre-genipin compounds, iridoid compounds, genipin derivatives, a genipin-containing substance and combinations of any thereof is disclosed.

DETAILED DESCRIPTION OF THE INVENTION

In one embodiment, the present invention is directed towards natural colorants comprising a material selected from the group consisting of genipin, pre-genipin compounds, iridoid compounds, genipin derivatives, genipin-containing substances, and combinations of any thereof, reacted with a primary amine containing compound. In further embodiments, the primary amine containing compound is an amino acid.

In another embodiment, the present invention is directed towards processes of making a natural colorant comprising adding a primary amine containing compound to a material selected from the group consisting of genipin, pre-genipin compounds, iridoid compounds, genipin derivatives, genipin-containing substances, and combinations of any thereof, thus forming a blend, and heating the blend, thus producing the natural colorant. In further embodiments, the primary amine containing compound is an amino acid.

In yet another embodiment, the present invention is directed towards processes of producing a desired color of a natural colorant comprising mixing a primary amine containing compound with a material selected from the group consisting of genipin, pre-genipin compounds, iridoid compounds, genipin derivatives, genipin-containing substances, and combinations of any thereof. In further embodiments, the primary amine containing compound is an amino acid. In still further embodiments, the amino acid may be a combination of two or more amino acids.

The present invention contemplates many primary amine containing compounds, including but not limited to amino acids, derivatives of amino acids, methyl amine, gamma-Aminobutryic acid, polypeptides, proteins, and combinations of any thereof. Amino acids contemplated by the present invention include but are not limited to lysine, isoleucine, alanine, phenylalanine, serine, threonine, glutamic acid, glycine, arginine, glutamine, valine, leucine, methionine, asparagine, tyrosine, aspartic acid, cysteine, histidine, proline, tryptophan, and combinations of any thereof. The amino acids may further be isolated or purified amino acids. Derivatives of amino acids contemplated by the present invention include but are not limited to carnitine, taurine, and combinations of any thereof.

The present invention contemplates many sources of primary amine containing compounds or amino acids, including but not limited to fruits, vegetables, grains, legumes, nuts, seeds, plant materials, animal materials including but not limited to milk and eggs, microbial and algal materials, by-products of any thereof, and combinations of any thereof.

In a further embodiment, the amino acid is selected from the group consisting of lysine, isoleucine, alanine, phenylalanine, serine, threonine, glutamic acid, glycine, glutamine, leucine, methionine, asparagine, tyrosine, derivatives of any thereof, and combinations of any thereof, thus forming a blue colorant. In yet a further embodiment, a first amino acid and a second amino acid are each independently selected from the group consisting of lysine, isoleucine, alanine, phenylalanine, serine, threonine, and combinations of any thereof, thus producing a blue color. In a further embodiment, an additional amino acid selected from the group consisting of lysine, isoleucine, alanine, phenylalanine, serine, threonine, glutamic acid, glycine, arginine, glutamine, valine, leucine, methionine, asparagine, tyrosine, aspartic acid, cysteine, histidine, proline, tryptophan, derivatives of any thereof, and combinations of any thereof is mixed with the first amino acid and second amino acid.

In a further embodiment, the amino acid is selected from the group consisting of aspartic acid, glutamic acid, cysteine, and combinations of any thereof, thus forming a yellow/green colorant.

In a further embodiment, the amino acid is selected from the group consisting of proline, alanine, arginine, valine, derivatives of any thereof, and combinations of any thereof, thus forming a blue-red/purple colorant. In a further embodiment, the colorant has a bluish-red color.

In a further embodiment, the material or the genipin-containing substance is selected from the group consisting of fruits from *Genipa americana*, fruits from close relatives of *Genipa americana*, and combinations of any thereof. *Genipa americana*, also referred to as huito or huito fruit, is one species within the *Genipa* genus, which falls under the Rubiaceae family of plants. Without restricting the scope of fruits that may be used, *Genipa americana* should be taken to include edible fruits or juices or extracts or edible parts of related plants including *Gardenia* and *Kailarsenia* and other genipin-containing plants, further including *Gardenia jasminoides* Ellis and its varieties. In preferred embodiments, the material is huito fruit.

In a further embodiment, the material is in the form selected from the group consisting of whole fruit, fruit juice, fruit puree, fruit juice concentrate, dried powder from fruit, dried powder from juice, water-insoluble parts of fruit including but not limited to seeds and sacs, derivatives of any thereof, and combinations of any thereof.

In a further embodiment, the primary amine containing compound or amino acid is present in an amount of at least 0.25% by weight relative to the weight of the material, wherein the material is selected from the group consisting of *Genipa americana*, fruits from close relatives of *Genipa americana*, and combinations of any thereof. In yet a further embodiment, the primary amine containing compound or amino acid is present in an amount of about 0.25-10% by weight relative to the weight of the material, wherein the material is selected from the group consisting of *Genipa americana*, fruits from close relatives of *Genipa americana*, and combinations of any thereof. In another embodiment, the primary amine containing compound or amino acid is present in an amount of about 0.5-4.0% by weight relative to the weight of the material, wherein the material is selected from the group consisting of *Genipa americana*, fruits from close relatives of *Genipa americana*, and combinations of any thereof. In a preferred embodiment, the primary amine containing compound or amino acid is present in an amount of about 0.75-1.50% by weight relative to the weight of the material, wherein the material is selected from the group consisting of *Genipa americana*, fruits from close relatives of *Genipa americana*, and combinations of any thereof. In further embodiments, the *Genipa americana* or fruits from close relatives of *Genipa americana* may include any part of the fruits including but not limited to a juice, an extract, an edible part, and combinations of any thereof.

In a further embodiment, the primary amine containing compound or amino acid is present in an amount of from 0.1:1 to 10:1 (molar ratio, primary amine containing compound or amino acid:material, wherein the material is genipin or purified genipin). In a further embodiment, the primary amine containing compound or amino acid is present in an amount of from 0.25:1 to 4:1 (molar ratio, primary amine containing compound or amino acid:material, wherein the material is genipin or purified genipin). In a preferred embodiment, the primary amine containing compound or amino acid is present in an amount of from 0.5:1 to 1:1 (molar ratio, primary amine containing compound or amino acid:material, wherein the material is genipin or purified genipin). In a more preferred embodiment, the primary amine containing compound or amino acid is present in an amount of about 1:1 (molar ratio, primary amine containing compound or amino acid:material, wherein the material is genipin or purified genipin).

In a further embodiment, the amino acid is selected from the group consisting of naturally derived amino acids, amino acids derived from fermentation, synthetic amino acids, and combinations of any thereof. In yet a further embodiment, the amino acid may be the L-enantiomer. In still a further embodiment, the amino acid may be in a powder or a liquid form. In yet a further embodiment, the amino acid may be in a salt form, including a hydrochloride or monohydrochloride salt form. In still a further embodiment, the amino acid may be in a base form.

In a further embodiment, the amino acid is selected from the group consisting of isoleucine, L-isoleucine, L-lysine monohydrochloride, L-arginine base, L-glutamic acid hydrochloride (HCl), L-phenylalanine, lysine, isoleucine, alanine, phenylalanine, serine, threonine, glutamic acid, glycine, arginine, glutamine, valine, leucine, methionine, asparagine, tyrosine, aspartic acid, cysteine, histidine, proline, tryptophan, and combinations of any thereof.

In a further embodiment, the amino acid is selected from, or the first amino acid and the second amino acid are each independently selected from, the group consisting of a combination of L-isoleucine and L-lysine monohydrochloride and a combination of isoleucine and lysine. In still a further embodiment, the first amino acid is isoleucine and the second amino acid is lysine. In yet a further embodiment, increasing the amount of isoleucine produces a blue color with green notes. In yet a further embodiment, increasing the amount of lysine produces a blue color with purple notes. In still a further embodiment, the amino acid is a blend of isoleucine and lysine ranging from 60-80% isoleucine and from 20-40% lysine. In yet a further embodiment, the ratio of the first amino acid to the second amino acid is from about 60:40 to about 80:20. In still a further embodiment, the amino acid is an about 70:30 (isoleucine:lysine) blend of isoleucine and lysine.

In yet a further embodiment, the amino acid is selected from isoleucine, alanine, and combinations of any thereof. In further embodiments, the combination of amino acids comprises 70-90% isoleucine. In yet a further embodiment, the amino acid is a blend of isoleucine and alanine ranging from 70-90% isoleucine and from 10-30% alanine. In further embodiments, the ratio of isoleucine to alanine is from about 70:30 to about 90:20. In preferred embodiments, the amino acid is an about 80:20 (isoleucine:alanine) blend of isoleucine and alanine.

In a further embodiment, the natural colorant has an L-value ranging from about 20 to about 55, an a-value ranging from about −2.0 to about 6.5, and a b-value ranging from about 1 to about −20. In a further embodiment, the natural colorant has a CV of from about 0.04 to about 55. In yet a further embodiment, concentration of the natural colorant results in a natural colorant with a CV of greater than 55.

The present invention lists measurements for the natural colorants in terms of CV, Brix, and L, a-, and b-values. CV, or color value units, are a trade designation for a measure of concentration. Brix, or degrees Brix, is a unit of measurement for the sugar (and other solids) concentration of liquids, which may be measured by both density and refractive index. L, a-, and b-values are reported for measurement using a Hunter colorimeter.

In another embodiment, the natural colorant may be used in an application selected from the group consisting of food applications, beverage applications, animal food applications, oral care applications including but not limited to toothpaste and mouthwash, personal care applications including but not limited to soap, shampoo, and fragrance, cleaning supplies, and combinations of any thereof. In a further embodiment, the natural colorant may be used in the food application. In yet a further embodiment, the natural colorant may be used in the beverage application.

In a further embodiment, the heating the blend is carried out at from about 5° C. to about 65° C. In a further embodiment, the heating the blend is carried out at about 20° C. to about 60° C. In yet a further embodiment, the heating the blend is carried out at about from 35° C. to about 45° C.

In a further embodiment, the material is processed before adding the amino acid. In yet a further embodiment, the processing comprises an action selected from the group consisting of chopping, blending, blending with water, blending with a solvent, blending with a permeate, mashing, extracting juice, milling, filtering, pressing, heating, drying, and combinations of any thereof.

In a further embodiment, an enzyme is added to the blend. In yet a further embodiment, the enzyme is β-glucosidase.

In a further embodiment, the blend or the natural colorant is filtered. Various types of filtration are contemplated by the present invention, including but not limited to nanofiltration and ultrafiltration. Nanofiltration generally refers to filtration using a membrane with a molecular weight cutoff of less than 5,000 Daltons. Nanofiltration may also refer to filtration using a membrane with a molecular weight cutoff of 200-2,000 Daltons. In some embodiments of the present invention, the membrane has a molecular weight cutoff of about 5,000 Daltons or less. In further embodiments of the present invention, the membrane has a molecular weight cutoff of about 3,000 Daltons or less. In other embodiments of the present invention, the membrane has a molecular weight cutoff of about 1,000 Daltons or less. It was found that using the membrane with the molecular weight cutoff of about 1,000 Daltons or less provided better retention of color body.

In further embodiments, the blend is filtered, resulting in the permeate. In still further embodiments, the permeate is recycled in processes according to the present invention. In yet further embodiments, processes of making a natural colorant comprising mixing a primary amine containing compound to a material selected from the group consisting of genipin, purified genipin, pre-genipin compounds, iridoid compounds, genipin derivatives, genipin-containing substances, and combinations of any thereof, thus forming a blend, and heating the blend, thus producing the natural colorant further comprise mixing the permeate with the primary amine containing compound; the material selected from the group consisting of genipin, purified genipin, pre-genipin compounds, iridoid compounds, genipin derivatives, genipin-containing substances, and combinations of any thereof; the blend; or combinations of any thereof. In a further embodiment, the permeate is a source of all or some of the primary amine containing compound or the amino acid for processes of the present invention.

In yet a further embodiment, the natural colorant is heated. In still a further embodiment, the heating the natural colorant is carried out at a temperature of from about 10° C. to about 100° C. In a preferred embodiment, the heating the natural colorant is carried out at a temperature of about 80° C.

In a further embodiment, the natural colorant is concentrated. In yet a further embodiment, water is added to the group consisting of the amino acid, the material, the natural colorant, and combinations of any thereof.

In still a further embodiment, the pH of the natural colorant is adjusted. In yet a further embodiment, the pH of the natural colorant is adjusted by adding a base to the natural colorant. In preferred embodiments, the base is sodium hydroxide. In still another embodiment, the pH of the natural colorant is adjusted by adding an acid to the natural colorant. In further embodiments, the acid is selected from the group consisting of hydrogen chloride, citric acid, and combinations of any thereof. In a preferred embodiment, the acid is citric acid. In still further embodiments, the pH of the natural colorant may be adjusted after addition of an amino acid to a material selected from the group consisting of genipin, pre-genipin compounds, iridoid compounds, genipin derivatives, and combinations of any thereof, including but not limited to huito fruit, but before an initial heating. In further embodiments, the pH of the natural colorant may be adjusted after the initial heating and before a secondary heating. In yet further embodiments, the pH of the natural colorant is adjusted to about 4-9. In preferred embodiments, the pH of the natural colorant is adjusted to around 7.0. In still further embodiments, the pH of the natural colorant or the blend may be adjusted continuously throughout processes of the present invention. In yet further embodiments, the pH of the natural colorant or the blend may be adjusted to optimize the color value of the natural colorant.

In a further embodiment, a ratio of the first amino acid to the second amino acid is adjusted to achieve the desired color. In yet a further embodiment, more than 2 amino acids are combined.

In yet another embodiment, the processes of the present invention may be carried out aerobically. In preferred embodiments, the processes of the present invention for producing a blue natural colorant are carried out aerobically.

The invention is further explained by the following examples.

Example 1: Preparation of Natural Blue Colorant. Huito fruit was peeled, chopped, and blended with water (ratio of 1:2.5, huito:water). The resulting mixture was heated at 40° C. for 10 minutes while adding 4% by weight (relative to the huito fruit weight) of an amino acid solution (isoleucine:lysine, 70:30). The resulting blend was filtered by vacuum filtration, and the filtrate was heated at 80° C. for 3 hours and concentrated.

It was found that adjusting the ratio of isoleucine:lysine produced variations in color. Increasing the amount of isoleucine produced greener colors, while increasing the amount of lysine produced more purple notes. The 70:30 isoleucine:lysine ratio produced a vibrant blue color. However, given natural discrepancies inherent in the fruit, specific ratios may need to be adjusted to achieve a desired shade of the natural colorant.

Color values (CV) as well as L, a, and b-values were measured before concentration. These values were measured at 2 separate facilities, giving the following results, summarized in Tables 1 and 2 below.

Figure 1:
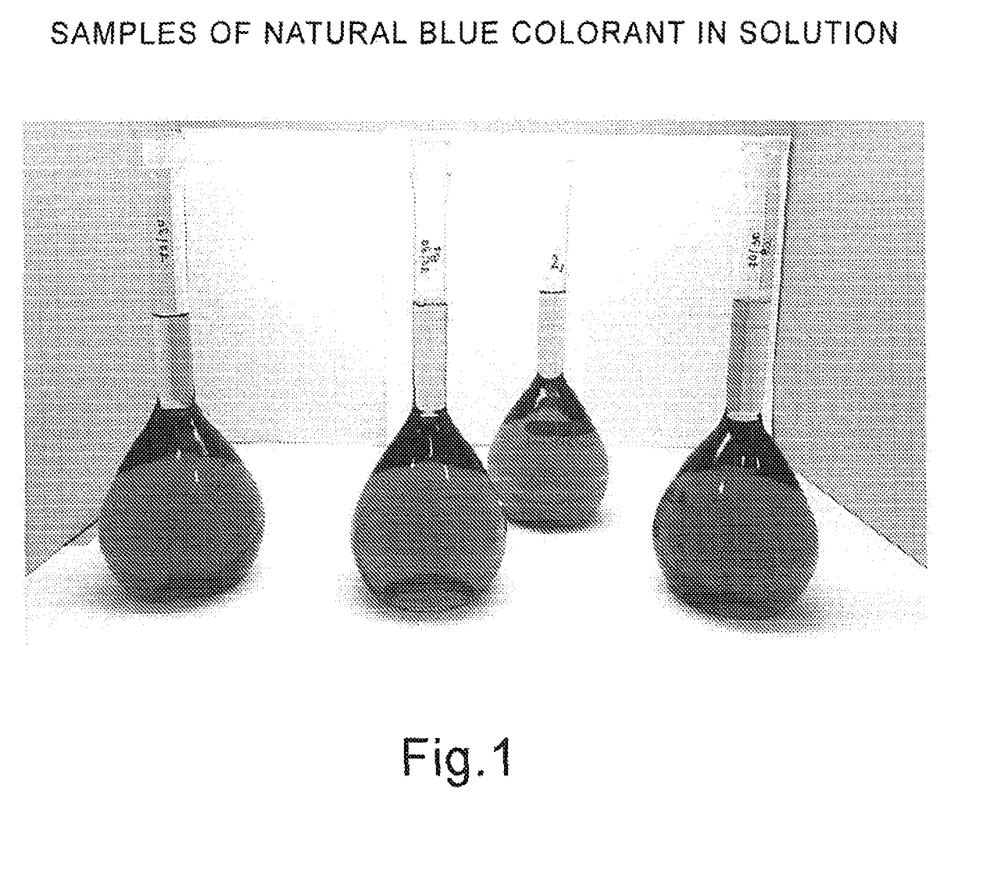
FIG. 1 shows samples of one embodiment of a blue colorant in solution produced according to one process of the present invention.

FIG. 1 shows four natural colorants prepared according to processes of the present invention. The colorant furthest to the left is a shade of blue with almost no green or purple notes. The colorant second from the left has slightly more purple notes than the colorant furthest to the left. The colorant third from the left has more purple notes than the colorant second from the left. The colorant on the right is a deeper/darker shade of blue than the colorant furthest to left.

TABLE 1

Color Values of Natural Blue Colorant
Measured at Location 1

| Trial | CV | Brix | L | a | b |
|---|---|---|---|---|---|
| 1 | 3.51 | 8.1 | 35.75 | 1.96 | −7.21 |
| 2 | 5.58 | 12.9 | 36.11 | 1.51 | −7.12 |
| 3 | 3.09 | 7.8 | 41.55 | 2.51 | −8.99 |
| 4 | 3.35 | 7.6 | 41.11 | 1.69 | −7.55 |
| 5 | 4.87 | 11.2 | 41.18 | 0.73 | −7.80 |
| 6 | 4.46 | 12.1 | 40.96 | 1.79 | −9.02 |
| 7 | 4.35 | 11.9 | 39.87 | 2.18 | −8.22 |

TABLE 2

Color Values of Natural Blue Colorant
Measured at Location 2

| Trial | CV | Brix | L | a | b |
|---|---|---|---|---|---|
| 4 | 3.33 | — | 42.12 | 1.42 | −8.48 |
| 6 | 4.46 | — | 43.24 | 1.36 | −9.71 |
| 7 | 4.30 | — | 41.84 | 1.86 | −9.27 |

The small differences in values between Table 1 and Table 2 can be explained by differences in equipment used for the testing.

Concentration may increase the CV values from 3 to 55 or higher. A natural blue colorant with a higher CV, for example a CV of 55, would be beneficial by allowing for a lower inclusion rate and improved cost in use (CIU), as compared to natural blue colorants with much lower CV values which require a high usage rate.

The natural blue colorants have a low, positive a-value and a high, negative b-value.

The natural blue colorants produced were found to be light stable, heat stable, and acid stable.

Example 2: Preparation of Natural Colorants. The pulp/seeds/sac of huito fruit (*Genipa americana*) was removed from the raw fruit (unripe), dried, and ground into a powder. To the huito powder (10.0 g), deionized water (90.0 g) was added. The huito powder was mixed with the water and soaked for 30 minutes. To the huito powder and water was added B-glucosidase (0.15 g). After 30 minutes, the mixture was filtered to remove insoluble matter. The pH of the filtrate was adjusted to 6.80 by adding a 10% sodium hydroxide (NaOH) solution. The resulting solution was divided into 5.00 g samples.

Figure 2:
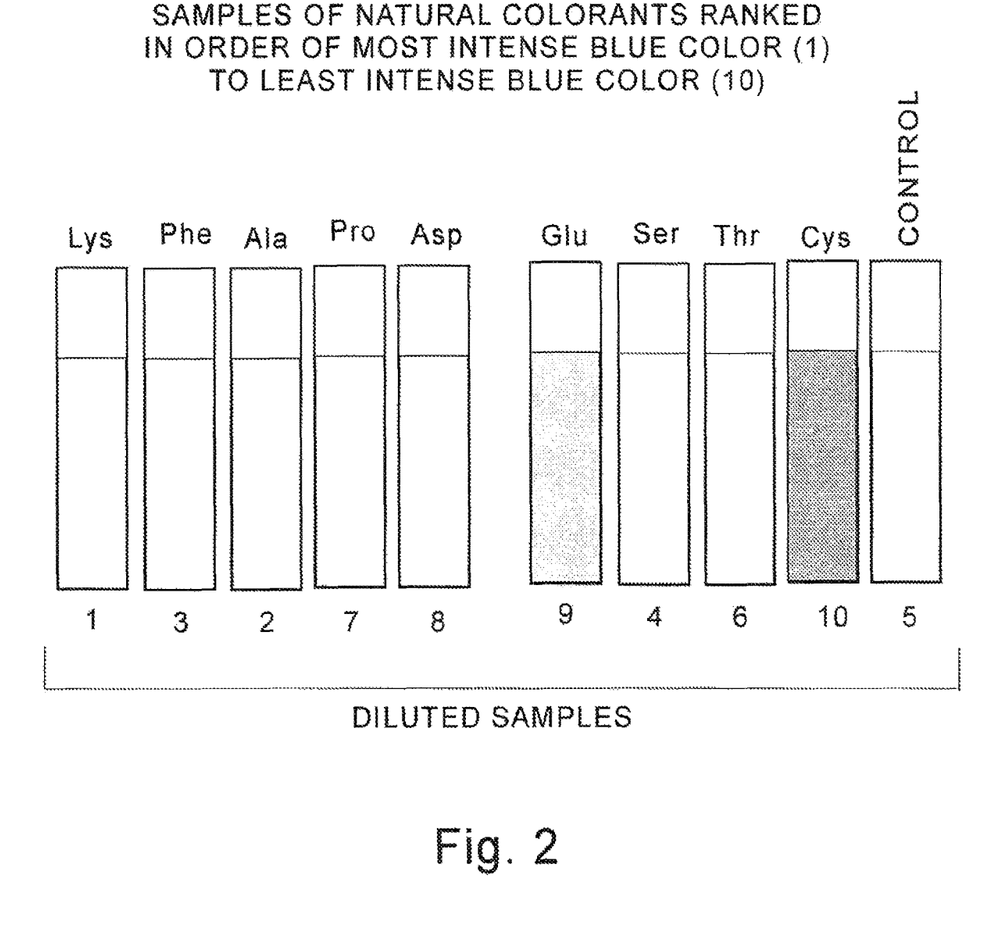
FIG. 2 shows a comparison of samples of embodiments of natural colorants, produced according to processes of the present invention, before and after dilution.

Different amino acids were added to each sample, with a total of 0.05 g amino acids added to each sample. The samples were left for 15 hours. After 15 hours, the color changes were observed (FIG. 2). FIG. 2 shows the test tubes containing the samples before dilution on the left and after dilution on the right. Descriptions of the variations in colors and intensities are in the following paragraph, and summarized in the Table 3 below.

Figure 3:
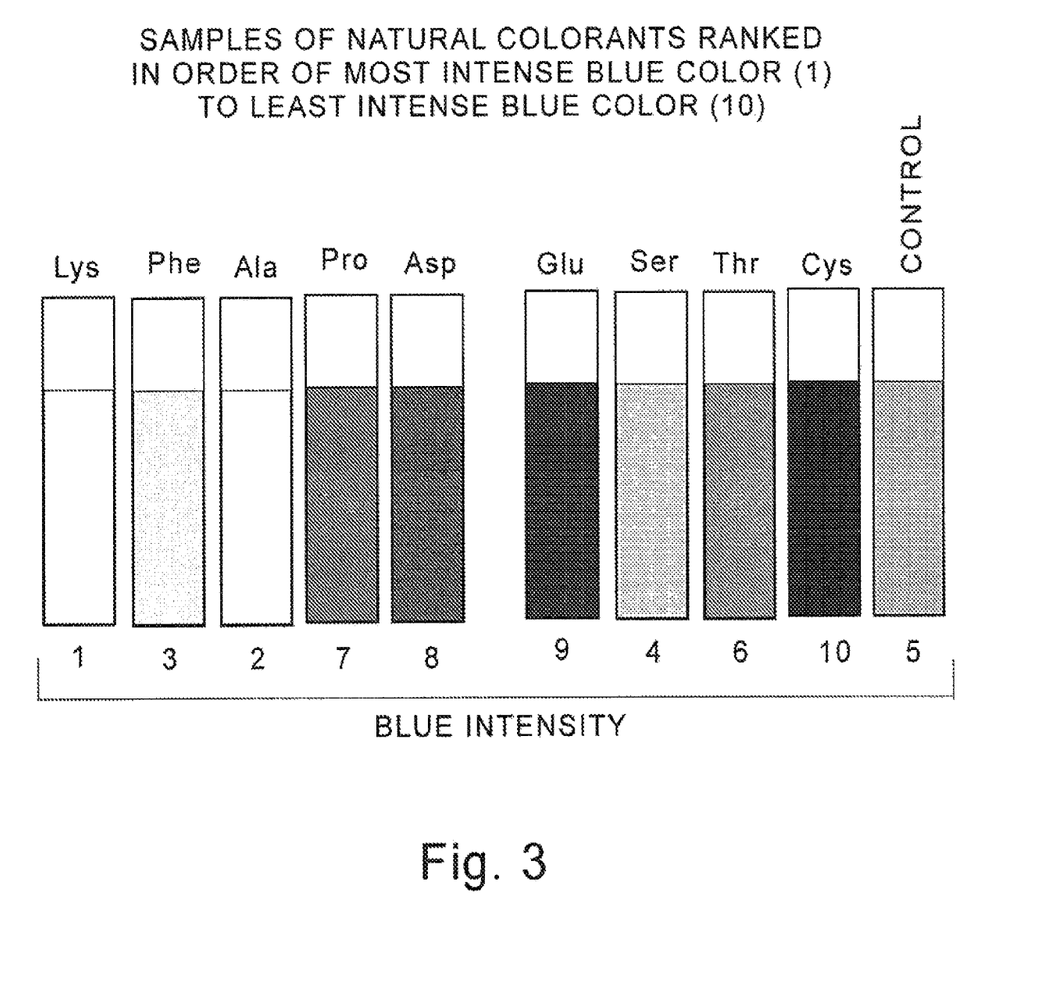
FIG. 3 shows samples of embodiments of natural colorants, produced according to processes of the present invention, ranked in order of most intense blue color to least intense blue color. These samples are undiluted.

The sample containing lysine produced the darkest blue color. The intensity of the blue colors of the samples, listed from strongest to weakest (identified by the amino acid added) was: lysine>alanine>phenylalanine>serine>threonine. The sample containing threonine produced approximately the same intensity of blue color as the control sample. The samples containing cysteine and glutamic acid produced yellow/green colors. The sample containing aspartic acid produced a greener color than the samples containing cysteine and glutamic acid. The sample containing proline produced a blue/red color. All the samples were diluted (10-times) with deionized water (FIG. 2). The undiluted samples settled for an additional day. The colors of the samples, ranked by intensity/color spectrum and identified by the amino acid added was: lysine (navy blue)>alanine (navy blue)>phenylalanine (light blue)>serine (greyish) >control (red purple, with more blue)>threonine (greenish) >proline (red purple)>aspartic acid (slightly greenish grey) >glutamic acid≈cysteine (yellow/green). The results are summarized in Table 3 below and shown in FIG. 3. FIG. 3 shows samples of natural colorants ranked in order of most intense blue color (1) to least intense blue color (10).

TABLE 3

Preparation of Natural Colorants

| Sample | Amino Acid (0.05 g) | Color; blue intensity (1 = most intense) | Color; blue intensity (1 = most intense)- after 10× dilution with deionized water + standing for 1 day |
|---|---|---|---|
| 1 | L-Lysine HCl natural | Blue; 1 | Navy blue; 1 |
| 2 | L-Phenylalanine natural | Blue; 3 | Light blue; 3 |
| 3 | L-Alanine- natural | Blue; 2 | Navy blue; 2 |
| 4 | L-Proline natural | Blue/red | Red purple; 7 |
| 5 | L-Aspartic acid natural | Green | Slightly greenish grey; 8 |
| 6 | L-Glutamic acid HCl natural | Yellow/green | Yellow/green; 9 |
| 7 | L-serine | Blue; 4 | Greyish; 4 |
| 8 | L-Threonine natural | Blue; 5 | Greenish; 6 |
| 9 | L-cysteine HCl natural | Yellow/green | Yellow/green; 10 |
| 10 | None (control) | Blue; 5 | Red purple with more blue; 5 |

Figure 4:
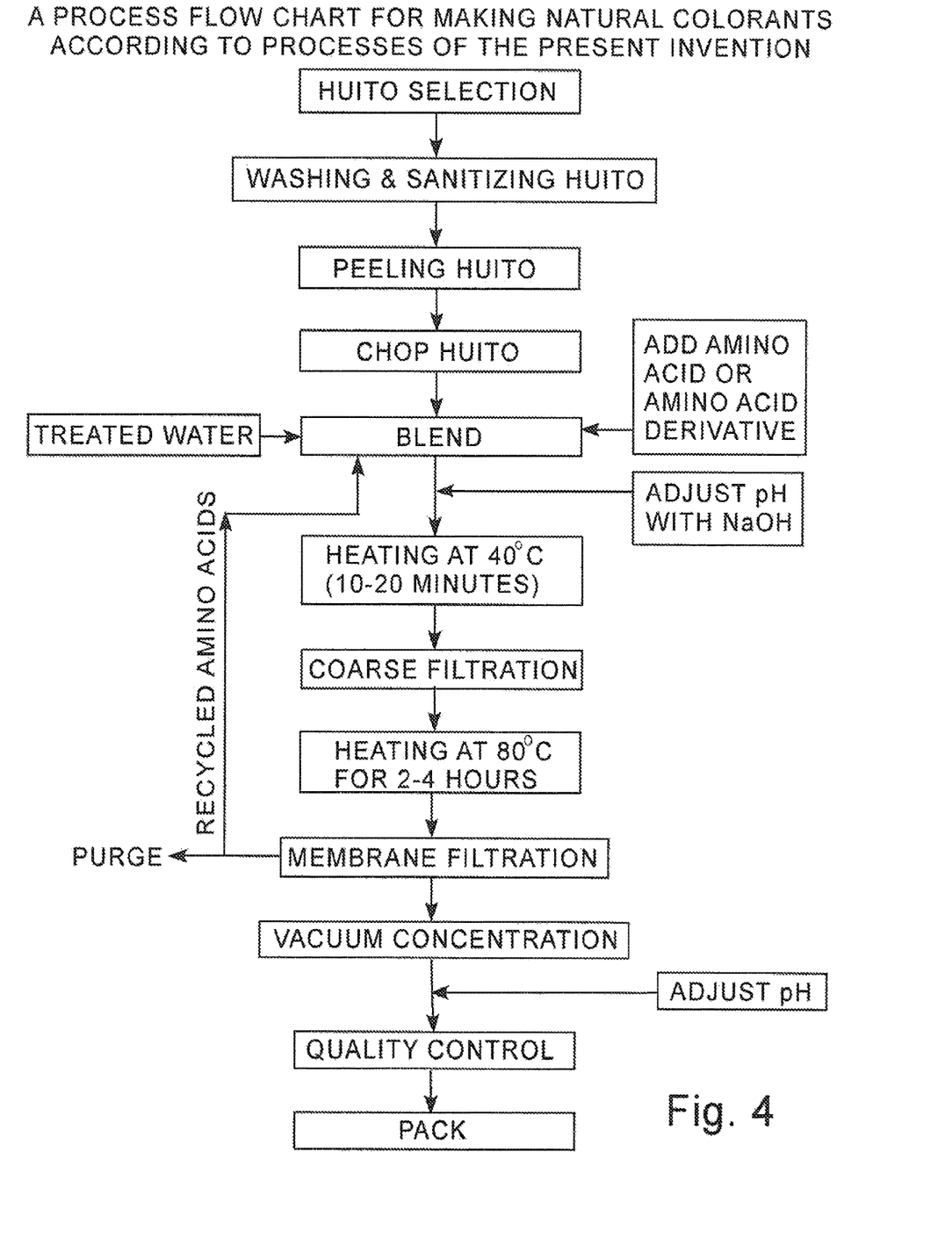
FIG. 4 shows a process flow chart for producing embodiments of natural colorants according to methods of the present invention.

Example 3: Methods of Preparing Natural Colorants. FIG. 4 shows a process flow chart for making natural colorants. Huito fruit is selected, washed and sanitized, peeled, chopped, and blended with treated water and at least one amino acid. For example, 1.0% isoleucine (by weight of the huito fruit) or 0.75% alanine (by weight of the huito fruit) may be used. The pH is adjusted to 7.0 with a sodium hydroxide solution, resulting in a pH-adjusted mixture. The pH-adjusted mixture is heated at 40° C. for 10-20 minutes, coarse filtered, heated at 80° C. for 2-4 hours, and filtered using a membrane having 3,000 Dalton or less molecular weight cutoff, resulting in permeate and colorant. The permeate may either be discarded, or recycled and used in place of the treated water and/or the at least one amino acid. The colorant is vacuum concentrated and pH-adjusted to 4.2. The colorant may be subjected to quality control. The colorant may be packed.

Example 4: Effect of Recycling Permeate on Methods of Preparing Natural Colorants. A natural colorant was made (the control), and the permeate from making the control was used to make another natural colorant (the test). The color values were measured for both the control and the test to determine the effects of using recycled permeate in making natural colorants.

The control was prepared by peeling and chopping huito fruit into small pieces. A ratio of 2 parts deionized water to 1 part huito fruit was blended with high sheer. Isoleucine was added (0.75% of the huito fruit, by weight). The pH was adjusted to 8.0 with a sodium hydroxide solution, resulting in a pH-adjusted mixture. The pH-adjusted mixture was heated at 40° C. for 20 minutes, coarse filtered, heated at 80° C. for 4 hours, and membrane filtered (resulting in a permeate), and optionally concentrated, thus resulting in the control. The pH was adjusted to 4.2 with a citric acid solution for microbiological stability. The color of the control was measured.

The test was prepared by peeling and chopping huito fruit into small pieces. A ratio of 2 parts permeate (the permeate from making the control) to 1 part huito fruit was blended with high sheer, producing a mixture. The permeate was obtained by membrane filtration using a membrane with a molecular weight cutoff of 3,000 Daltons or less (Hydracore 7410). A spiral wound membrane module (comprising layers of membranes separated by spacers) was used. The filtration is most effective when an appropriate spacer thickness is selected for the spiral wound membrane module. The spacer thickness may be in the range of from about 35 mil (1 mil=1/1000 of an inch) to about 120 mil. Permeation using a 45 mil spacer was compared to permeation using a 65 mil spacer, with the 45 mil spacer offering a better permeation rate than the 65 mil spacer. Isoleucine was added (total 0.75% of the huito fruit, by weight; with 0.576% from isoleucine powder and 0.174% from the permeate). The permeate contained 0.087% isoleucine. The pH of the mixture was adjusted to 8.0 with a sodium hydroxide solution, resulting in a pH-adjusted mixture. The pH-adjusted mixture was heated at 40° C. for 20 minutes, coarse filtered, and heated at 80° C. for 4 hours, resulting in the test. The pH was adjusted to 4.2 with a citric acid solution for microbiological stability. The color of the test was measured.

Table 4, below, shows the conditions used to make the test and the control

TABLE 4

Conditions for the Control and the Test

| | Control | Test |
|---|---|---|
| Huito fruit weight (g) | 85.83 | 100 |
| Permeate obtained from filtration using a Hydracore 7410 membrane, spiral wound; 2× concentrated (volume concentration factor); (g) | 0 | 200 (contained 0.174 g isoleucine) |
| Deionized water (g) | 171.66 | 0 |
| Isoleucine (g) (0.75% of the huito fruit, by weight) | 0.64 | 0.576 |
| Weight after filtration (g) | 165.49 | 191.17 |
| Initial sample taken out (g) | 15.8 | 15.09 |
| Sample taken out at 2 hours (g) | 15.85 | 15.56 |
| Final weight (at 4 hours) (g) | 133.84 | 160.52 |

Figure 5:
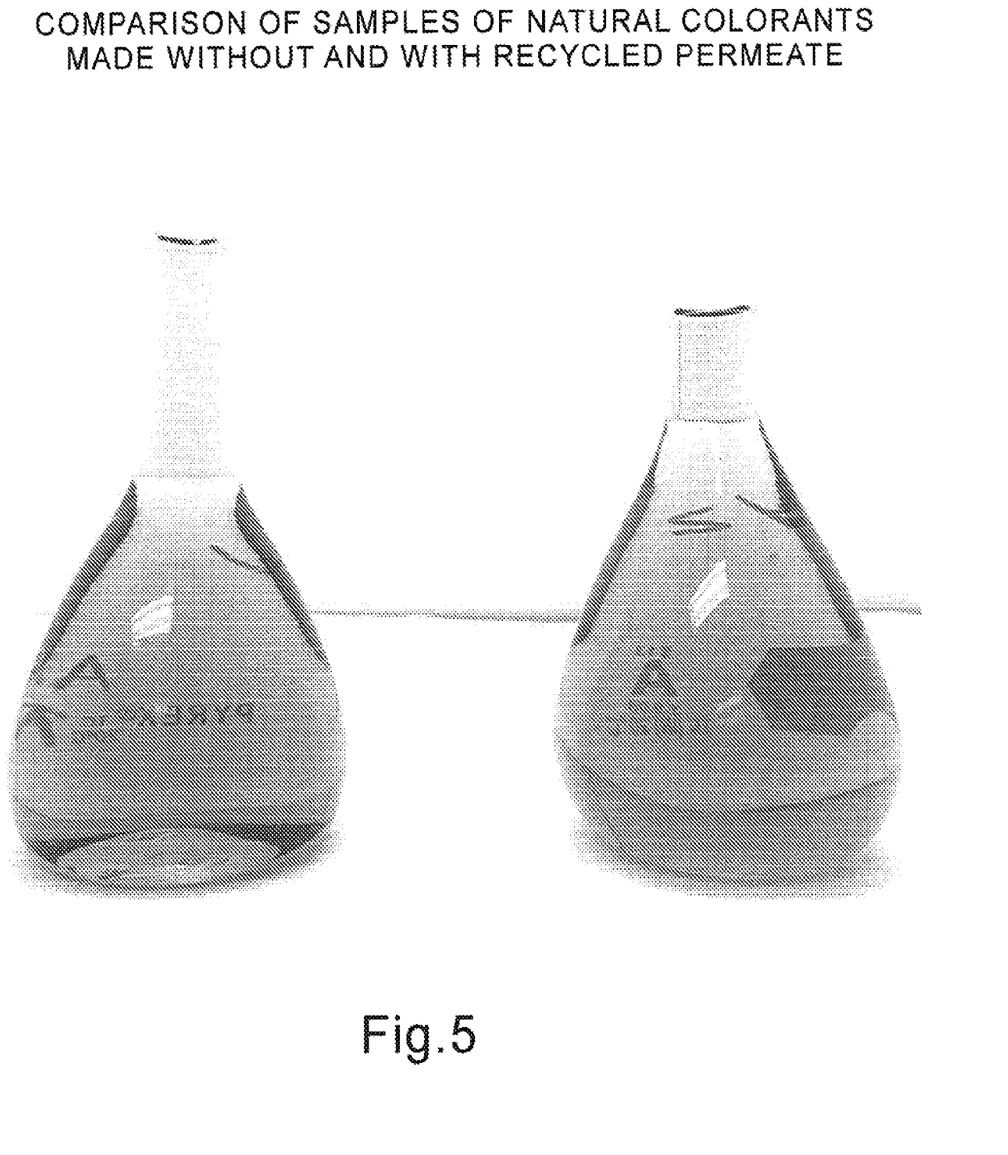
FIG. 5 shows a comparison of samples of natural colorants made without (pictured on the left) and with (pictured on the right) recycled permeate according to processes of the present invention.

The color value (CV), a measurement of strength of color, was the same between the control and the test. The color hue, as measured by the Hunter L, a, and b values, was very similar and not substantially different between the control and the test. The $\Delta E$ was less than 5, indicating that consumers would find it difficult to perceive any color differences. $\Delta E$ quantifies changes in color, with a $\Delta E$ value greater than 5 representing a color change which may be readily observed by consumers. $\Delta E$ is calculated by the equation: $\Delta E = \text{square root of } \{(L_0-L)^2+(a_0-a)^2+(b_0-b)^2\}$. FIG. 5 shows the control on the left and the test on the right, confirming that both colorants are visually the same. Table 5, below, shows the detailed results of pH and color testing the control and the test.

TABLE 5

Results of pH and Color Testing the Control and the Test

| | lambda max (nm) | abs (Absorbance of lambda max) | Color value (CV) | L (0.5 CV) | a (0.5 CV) | b (0.5 CV) |
|---|---|---|---|---|---|---|
| Control (at 4 hours) | 595.07 | 0.36 | 1.86 | 41.25 | −1.08 | −8.01 |
| Test (at 4 hours) | 595.09 | 0.36 | 1.89 | 41.57 | −1 | −7.91 |

As can be seen in Table 5, the CV and Hunter L, a, and b values are very similar for both the control and the test. Recycling the permeate provides virtually the same color while reducing the fresh water requirement of methods of preparing natural colorants and reducing the purified amino acid requirement of methods of preparing natural colorants.

Example 5: Effect of pH Adjustment of Natural Colorants. Natural colorants (colorant A and colorant B) were prepared. For both colorant A and colorant B, a ratio of huito fruit to water of 1:3.6 was used. Isoleucine was added to both colorants at a rate of 1.5% by weight of huito fruit. The pH of both colorants was adjusted to a pH of 8 with a sodium hydroxide solution. Both colorants were heated for 10 minutes at 40° C. in a hot water bath, and both colorants were filtered. Colorant B was readjusted to a pH of 8, while colorant A had no further pH adjustments. Both colorants were heated for 3 hours at 80° C. in a hot water bath. Both colorants were adjusted to a pH of 4.2 with citric acid. The results of pH 10 and color testing of colorant A and colorant B are summarized below in Table 6 and Table 7.

TABLE 6

Colorant A pH and Color Testing Results

| Process Step | Time (hours:minutes) | CV | L | a | b | Genipin (ppm) | pH |
|---|---|---|---|---|---|---|---|
| Before amino acid added | n/a | n/a | n/a | n/a | n/a | n/a | 4.26 |
| After amino acid added & NaOH addition | n/a | n/a | n/a | n/a | n/a | n/a | 8.00 |
| After heating at 40° C. | 0:10 | n/a | n/a | n/a | n/a | n/a | 6.3 |
| After heating at 80° C. | 3:00 | 0.63 | 22.41 | −0.52 | −1.17 | 428 | 5.61 |

TABLE 7

Colorant B pH and Color Testing Results

| Process Step | Time (hours:minutes) | CV | L | a | b | Genipin (ppm) | pH |
|---|---|---|---|---|---|---|---|
| Before amino acid added | n/a | n/a | n/a | n/a | n/a | n/a | 4.26 |
| After amino acid added & NaOH addition | n/a | n/a | n/a | n/a | n/a | n/a | 8.00 |
| After heating at 40° C. | 0:10 | n/a | n/a | n/a | n/a | n/a | 6.28 |
| After readjusting pH with NaOH | n/a | n/a | n/a | n/a | n/a | n/a | 8.00 |
| After heating at 80° C. | 3:00 | 0.91 | 22.92 | −0.85 | −1.97 | 84 | 6.3 |

As can be seen by comparing the data in Table 6 and Table 7, colorant A, which only had the pH adjusted to 8.0 once (after the addition of the amino acid), had a color value (CV) of 0.63 after heating at 80° C. for 3 hours. However, colorant B, which had the pH adjusted to 8.0 twice (after the addition of the amino acid and after filtering after the initial heating at 40° C.), had a CV of 0.91, almost 45% higher than colorant A, giving colorant B a stronger color. This improvement in CV translates to a tremendous amount of cost savings. Such cost savings are achievable since a higher color value means that less of the colorant with the higher color value will be needed in an application, for example a food or beverage application, to achieve a desired color. Essentially, a higher color value equates to an improved yield of the colorant. Further savings could be achieved by continuously adjusting the pH throughout preparation of natural colorants.

Example 6: Preparation of Improved Natural Blue Colorant. Natural colorants prepared by reacting huito fruit with various amino acids were compared. A general procedure was followed. The general procedure involved combining huito fruit with water in a 1:3.6 (huito fruit:water) ratio, adding the various amino acids at various rates, adjusting the pH to 7 with a sodium hydroxide solution, heating for 20 minutes at 40° C. with constant stirring, filtering, heating for 4 hours at 80° C. with constant stirring and while adding water about every 30 minutes to account for evaporation, and adjusting the pH to 4.2.

For Test A, the amino acid used was isoleucine at a rate of 0.75% by weight of the huito fruit weight. For Test B, the amino acid used was alanine at a rate of 0.75% by weight of the huito fruit weight. For Test C, the amino acid used was a combination of isoleucine and alanine, with the isoleucine at a rate of 0.6% by weight of the huito fruit weight and with the alanine at a rate of 0.15% by weight of the huito fruit weight. The results of Test A, Test B, and Test C, and the analysis of a combination of the Test A colorant and the Test B colorant (80% Test A, 20% Test B) are summarized below.

TABLE 8

Test A Analysis

| Process | Time (hours:minutes) | CV | L | a | b |
|---|---|---|---|---|---|
| Reaction at 80° C. | 4:00 | 0.517 | 42.93 | −1.07 | −7.18 |

TABLE 9

Test B Analysis

| Process | Time (hours:minutes) | CV | L | a | b |
|---|---|---|---|---|---|
| Reaction at 80° C. | 4:00 | 0.795 | 42.56 | 0.18 | −8.97 |

TABLE 10

Test C Analysis

| Process | Time (hours:minutes) | CV | L | a | b |
|---|---|---|---|---|---|
| Reaction at 80° C. | 4:00 | 0.595 | 42.45 | −0.71 | −7.9 |

TABLE 11

Analysis of the Combination of Test A and Test B

|  | CV | L | a | b |
|---|---|---|---|---|
| 80:20 blend (TestA:TestB) | 0.576 | 42.8 | −0.83 | −7.52 |

Overall, the combination of isoleucine and alanine reacted with huito fruit results in an improved natural colorant with a better color having less green and more red (higher a-value) as compared to a colorant resulting from a mixture of huito fruit and isoleucine alone, and no observed precipitate. Similar results were observed by reacting amino acids separately with huito fruit and then blending the resultant colorants (as compared to mixing 2 or more amino acids with the huito fruit). The natural colorant produced by using alanine had a blue-red/purple color.

Figure 6:
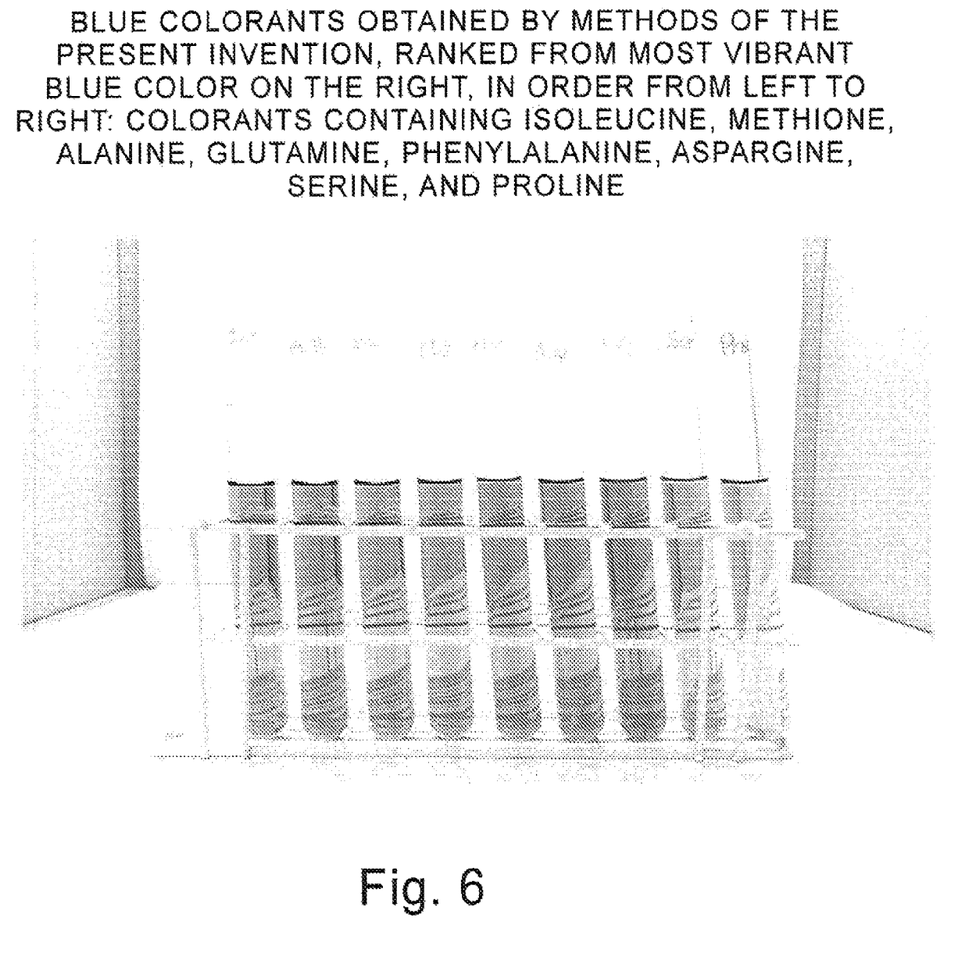
FIG. 6 shows blue colorants obtained by processes of the present invention, ranked from most vibrant blue color on the left to fainted blue color on the right, in order from left to right: colorants containing isoleucine, methionine, alanine, glutamine, phenylalanine, aspargine, arginine, serine, and proline

Example 7: Natural Colorants from Various Amino Acids. Processes substantially according to the previous process examples were used to make natural colorants using various amino acids (mixing huito fruit with water in about a ratio of 1:3.6 huito fruit:water, weight:weight; mixing various amino acids at a rate of about 1.5% by weight of the huito fruit weight, adjusting the pH with sodium hydroxide, heating for 20 minutes at 40° C., coarse filtering, heating for 2 hours at 80° C., and adjusting the pH with citric acid). For colorants (not concentrated) obtained from an aerobic process using huito fruit, the results are summarized in Table 12 below. FIG. 6 shows the varying colors of the blue colorants as summarized in Table 12 below. FIG. 6 shows colorants obtained by methods of the present invention, ranked from most vibrant blue color on the left to fainted blue color on the right, in order from left to right: colorants containing isoleucine, methionine, alanine, glutamine, phenylalanine, aspargine, arginine, serine, and proline. For colorants obtained from an aerobic process using a genipin extract, the results are summarized in Table 17 below. For additional colorants obtained from an aerobic process using a genipin extract, the results are summarized in Table 18 below.

The process of obtaining the genipin extract comprises washing, peeling, and cutting huito fruit; blending a ratio of 1.5:1 (water:huito fruit, weight:weight) water and huito fruit, and filtering to produce a huito juice. Genipin is extracted from the huito juice using buytl acetate (1:2 butyl acetate:huito juice, weight:weight). The extraction using butyl acetate is repeated. The butyl acetate is evaporated, resulting in a genipin extract which may be dried to a powder. To obtain the colorants as summarized in Table 13 and Table 14, the dried, genipin extract powder was dissolved in a mixture of water and ethanol and mixed with the amino acid, and heated for 2 hours.

TABLE 12

Natural Colorants from Aerobic Reaction of Huito Fruit with Various Amino Acids

| Amino Acid | Color (primary color/undertone) | L | a | b | CV |
|---|---|---|---|---|---|
| Alanine | Blue/red | 22.9 | −0.58 | −2.39 | 0.51 |
| Arginine | Blue/red | 22.82 | −0.81 | −2.15 | 0.54 |
| Asparagine | Blue/green | 22.73 | −0.69 | −1.91 | 0.56 |
| Glutamine | Blue/green | 22.87 | −0.7 | −2.05 | 0.51 |
| Isoleucine | Blue/green | 23.25 | −1.01 | −2.32 | 0.44 |
| Methionine | Blue/green | 23.05 | −0.99 | −2.14 | 0.49 |
| Phenylalanine | Blue/green | 22.97 | −1.08 | −1.91 | 0.51 |

TABLE 12-continued

Natural Colorants from Aerobic Reaction of Huito
Fruit with Various Amino Acids

| Amino Acid | Color (primary color/undertone) | L | a | b | CV |
|---|---|---|---|---|---|
| Proline | Light blue/grey | 23.63 | −0.65 | −1 | 0.11 |
| Serine | Light blue/purple | 23.32 | −0.76 | −2.5 | 0.37 |

TABLE 13

Natural, Concentrated Colorants from Aerobic Reaction
of Huito Fruit with Various Amino Acids

| Amino Acid | L | a | b |
|---|---|---|---|
| Taurine | 43.17 | 1.06 | −11.19 |
| Lysine | 43.65 | 1.35 | −10.91 |
| Alanine | 43.85 | 0.29 | −10.77 |
| Arginine | 44.61 | −1.06 | −10.19 |

TABLE 14

Natural Colorants from Aerobic Reaction of
Genipin Extract with Various Amino Acids

| Amino Acid | Color | L | a | b |
|---|---|---|---|---|
| Isoleucine | Green | 87.47 | −3.42 | −0.77 |
| Threonine | Green | 79.12 | −5.91 | −2.42 |
| Histidine | Blue | 71.13 | −7.82 | −17.46 |
| Tryptophan | Yellow/green | n/a | n/a | n/a |
| Phenylalanine | Deep green | n/a | n/a | n/a |

Example 8: Natural Colorants using Isoleucine or Alanine. Processes substantially according to the previous process examples were used to make natural colorants using isoleucine or alanine. The results of analysis of these natural colorants are summarized below.

TABLE 15

Natural Colorant using Isoleucine

| % amino acid (relative to weight of huito fruit) | Huito fruit to water ratio (weight/weight) | CV | Brix | L | a | b |
|---|---|---|---|---|---|---|
| 1.00 | 1:3.0 | 23.61 | 55.3 | 38.57 | 1.55 | −8.38 |
| 1.00 | 1:2.8 | 23.33 | 57.6 | 38.23 | 1.46 | −9.66 |

TABLE 16

Natural Colorant using Alanine

| % amino acid (relative to weight of huito fruit) | Huito fruit to water ratio (weight/weight) | CV | Brix | L | a | b |
|---|---|---|---|---|---|---|
| 0.75 | 1:2.48 | 19.46 | 49.1 | 38.51 | 4.03 | −8.55 |
| 0.75 | 1:2.8 | 18.61 | 57.9 | 38.88 | 5 | −9.75 |

Figure 7:
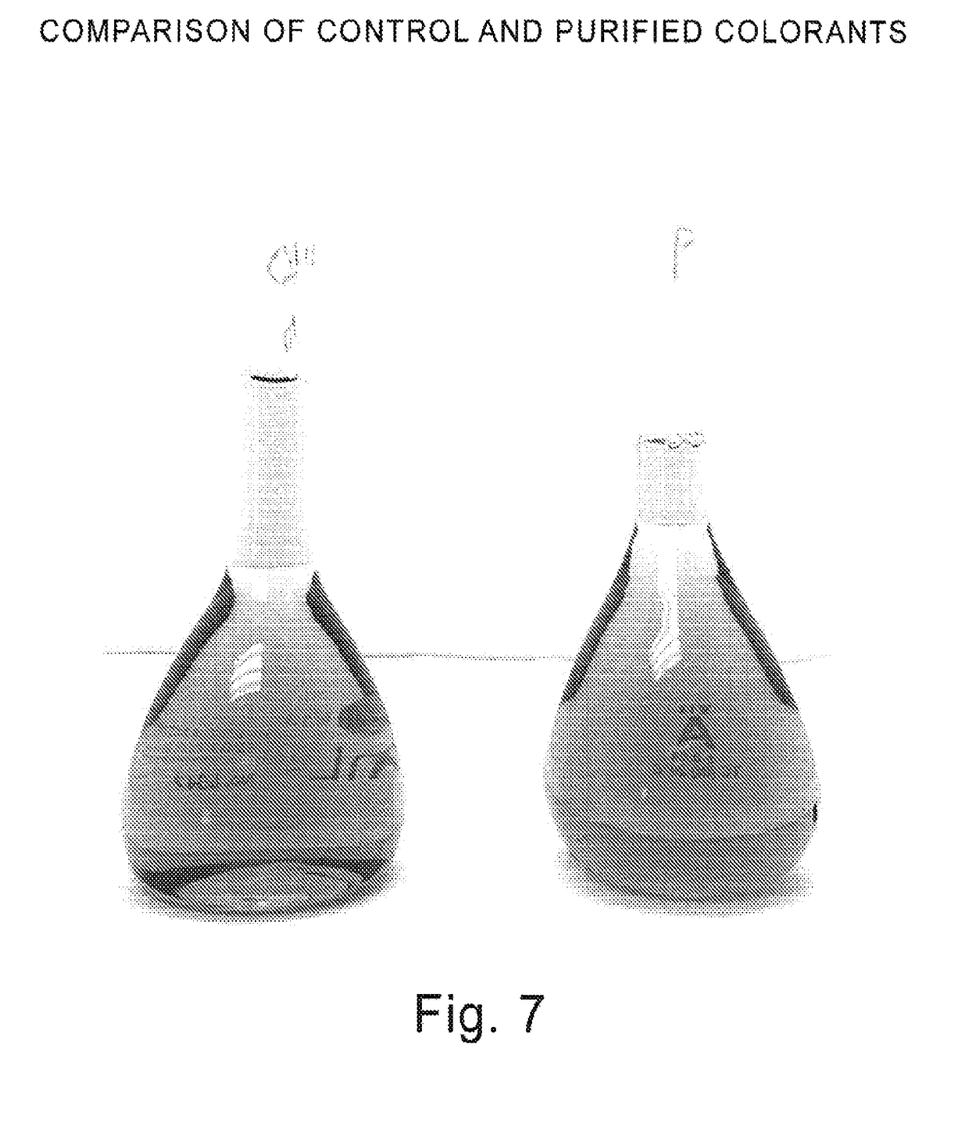
FIG. 7 shows a comparison of a control colorant and a purified colorant made according to processes of the present invention.

Example 9: Purified Colorant Trials. A general procedure of mixing huito fruit with water at a ratio of 1:3.6 huito fruit:water, weight:weight, heating at 40° C., and coarse filtering, resulting in a fruit extract, was used to prepare the colorants of this example. For the control colorant, isoleucine was added to the fruit extract at 1% by weight of the huito fruit weight and heated for 4 hours. For the purified colorant, the fruit extract was treated with 95% ethanol at a ratio of 1:2 fruit extract:ethanol, weight:weight, filtered, ethanol evaporated off, and mixed with isoleucine at a rate of 1% by weight of the huito fruit weight, and heated for 4 hours. FIG. 7 shows a comparison of the control and purified colorants. Results are summarized below.

TABLE 17

Comparison of Control and Purified Colorants

| Sample | Reaction Time (hours) | pH | Brix | Weight (g) in 100 mL | lambda max (nm) | abs (Absorbance) | CV | L | a | b |
|---|---|---|---|---|---|---|---|---|---|---|
| Control | 4 | 5.59 | 3.34 | 0.1883 | 590.99 | 0.27 | 1.44 | 42.78 | 0.71 | −10.78 |
| Purified | 4 | 5.42 | 3.05 | 0.2068 | 591.86 | 0.23 | 1.10 | 42.87 | 0.49 | −10.2 |

Example 10: Reduction of Residual Unreactive Amino Acids and Genipin. Processes substantially according to previous examples involving membrane filtration were followed. The samples were concentrated 2 times and passed through diafiltration. The results summarized below show that the amino acid (isoleucine) was reduced by 49% after the 2× concentration and reduced by 92% after diafiltration. Reduction of residual unreactive amino acids provide the benefit of allowing for a cleaner label on the final colorant product. The 2× concentration and diafiltration also remove all remaining unreacted genipin in the colorants.

TABLE 18

Analysis of Reduction of Residual Unreactive Amino Acids and Genipin

| Membrane | Molecular Weight cutoff | Sample | Genipin | Isoleucine | CV | L | a | b |
|---|---|---|---|---|---|---|---|---|
| Hydracore 7410 | 3000 | Initial | 65.11 | 0.0644% | 0.50 | 42.09 | 0.70 | −8.91 |
| | | 2x Filtration | | | 1.61 | 42.12 | 0.61 | −8.76 |
| | | Concentrate | 83.09 | 0.1060% | | | | |
| | | Adjust to equal CV | | 0.0329% | | | | |
| | | % Reduction | | 48.8831% | | | | |
| | | Diafiltration Concentrate | Not Detected | 0.0142% | 1.43 | 41.28 | 0.95 | −8.71 |
| | | Adjust to equal CV | | 0.0050% | | | | |
| | | % Reduction | | 92.2903% | | | | |

The present invention has been described with reference to certain examples. However, it will be recognized by those of ordinary skill in the art that various substitutions, modifications, or combinations of any of the examples may be made without departing from the spirit and scope of the invention. Thus, the invention is not limited by the description of the examples, but rather by the appended claims as originally filed.

What is claimed is:

1. A process of making a natural, blue colorant comprising:
    mixing an isolated or purified amino acid combination with a material, thus forming a blend;
    filtering the blend;
    heating the blend, thus producing the natural, blue colorant;
    adjusting a pH of the natural, blue colorant to between 4-9; and
    concentrating the natural, blue colorant;
    wherein the isolated or purified amino acid combination is present in an amount of from 0.25:1 to 4:1 molar ratio of the isolated or purified amino acid combination to the material;
    wherein the material is in the form selected from the group consisting of whole fruit, fruit juice, fruit puree, fruit juice concentrate, dried powder from fruit, dried powder from juice, water-insoluble parts of fruit, and combinations of any thereof;
    wherein the fruit is *Genipa americana;*
    wherein the isolated or purified amino acid combination is a combination of isolated or purified isoleucine and isolated or purified lysine, or isolated or purified isoleucine and isolated or purified alanine, or a combination of isolated or purified isoleucine and isolated or purified lysine and isolated or purified alanine.

2. The process of claim 1, wherein isoleucine is in a greater amount than lysine in the combination of isoleucine and lysine, and isoleucine is in a greater amount than alanine in the combination of isoleucine and alanine.

3. The process of claim 1, wherein the isolated or purified amino acid combination is present in an amount of about 0.25-10% by weight relative to the weight of the material.

4. The process of claim 1, wherein the heating the blend is carried out at about 20° C. to about 60° C.

5. The process of claim 1, further comprising processing the material before adding the isolated or purified amino acid combination with an action selected from the group consisting of chopping, blending, blending with water, mashing, extracting juice, milling, filtering, pressing, heating, drying, and combinations of any thereof.

6. The process of claim 1, wherein the filtering the blend further comprises passing the blend through a membrane with a molecular weight cutoff of 5,000 Daltons or less.

7. The process of claim 1, further comprising heating the blend a second time.

8. The process of claim 1, further comprising adding an enzyme to the blend.

9. The process of claim 1, wherein the process is performed in aerobic conditions.

10. The process of claim 1, wherein the isolated or purified amino acid combination is the combination of isolated or purified isoleucine and isolated or purified alanine, or a combination of isolated or purified isoleucine and isolated or purified lysine and isolated or purified alanine.

* * * * *